United States Patent [19]
Giroire

[11] Patent Number: 5,853,075
[45] Date of Patent: Dec. 29, 1998

[54] CLUTCH MODULE HAVING IMPROVED MEANS FOR FASTENING IT

[75] Inventor: Jean-Pierre Giroire, St. Germain-En-Laye, France

[73] Assignee: Valeo, Paris, France

[21] Appl. No.: 740,054

[22] Filed: Oct. 24, 1996

[30]     Foreign Application Priority Data

Oct. 24, 1995 [FR] France .................................. 95 12522

[51] Int. Cl.⁶ .................................................. F16D 13/68
[52] U.S. Cl. .................................... 192/70.16; 192/70.27; 192/89.23
[58] Field of Search ............................... 192/70.13, 70.16, 192/70.17, 70.27, 89.23, 113.4

[56]         References Cited

U.S. PATENT DOCUMENTS

| | | |
|---|---|---|
| 2,709,470 | 5/1955 | Knohl . |
| 3,711,347 | 1/1973 | Wagner et al. . |
| 5,321,878 | 6/1994 | Schierling ........................ 192/70.13 X |
| 5,415,261 | 5/1995 | Friedmann ........................... 192/70.17 |
| 5,680,918 | 10/1997 | Reik et al. ........................ 192/70.13 X |

FOREIGN PATENT DOCUMENTS

| | | |
|---|---|---|
| 2546594 | 11/1984 | France . |
| 2583483 | 12/1986 | France . |
| 4317332 | 12/1993 | Germany . |

*Primary Examiner*—Richard M. Lorence
*Attorney, Agent, or Firm*—Longacre & White

[57]         ABSTRACT

The clutch module (10) includes, in succession, a cover plate (12), a diaphragm (14), a pressure plate (16), a friction disc (18) and a reaction plate (20) fixed to the cover plate (12), the reaction plate (20) being mounted on a support plate (22) by means of a set of fastening members (64), each fastening member (64) being a screw which has a head (66) received in a complementary housing (70) formed in the friction surface (32) of the reaction plate (20). Each of the cover plate (12), the diaphragm (14), the pressure plate (16) and the friction liner (36, 38) includes at least one hole (121, 141, 161, 181) enabling access to be gained to the head (66) of a fastening member (64), with the aid of a tool, when the said holes are aligned axially (Y—Y) with the head (66).

9 Claims, 2 Drawing Sheets

CLUTCH MODULE HAVING IMPROVED MEANS FOR FASTENING IT

BACKGROUND OF THE INVENTION

1. Field of the invention.

The present invention relates to a clutch module, especially for a motor vehicle.

More particularly, the invention relates to a clutch module, of the type comprising an assembly of adjacent components of generally annular form coaxial with each other, among which are arranged, in succession, a cover plate, a diaphragm, a pressure plate coupled in rotation to the cover plate by fastening means for enabling the pressure plate to be displaced axially with respect to the cover plate, a friction disc for coupling the clutch module in rotation to a driven shaft, and a reaction plate fixed to the cover plate by fastening means arranged at the outer periphery of the module, of the type in which the friction disc includes at least one peripheral annular friction liner, which is interposed between radial friction surfaces, in facing relationship with each other, of the pressure plate and reaction plate, wherein the diaphragm bears against the cover plate and the pressure plate in order to bias the latter axially in the direction corresponding to gripping of the friction liner, and of the type in which the reaction plate is adapted to be mounted on a support plate which is fixed in rotation to a driving shaft, by means of a set of fastening members which are disposed radially inwardly with respect to the means fastening the reaction plate on the cover plate.

2. Description of the Prior Art.

One example of such a clutch module is described and shown in FIG. 6 of the document FR-A-2 546 594. In the embodiment proposed in that document, the members for fastening the reaction plate on the support plate consist of a set of screws, the head of which is disposed on the outside of the module, with its threaded shank passing through a corresponding hole formed in the support plate and being received, and screwed into, a threaded hole formed in facing relationship in the radial face of the pressure plate opposite to its friction surface.

The fitting of the clutch module on to the support plate coupled to the crankshaft of the engine therefore makes it necessary to be able to insert the screws and to gain access to the heads of the screws from the "engine" side of the assembly.

Access to the fastening screws is therefore particularly difficult, and it makes automation of the fitting and fastening operations practically impossible, especially with a multiple head screw-fastening machine which would enable all of the fastening screws to be tightened simultaneously.

In addition, the insertion of the screws into the threaded holes in the fastening plate is carried out blind, subject to the provision of complementary means for the angular indexation in position of the clutch module with respect to the support plate, such as for example indexing pins arranged between the reaction plate and the support plate.

Because of the coupling of the reaction plate through the interposed threaded free end portions of the screws, successive heating and cooling action in the reaction plate gives rise to differential expansion effects, which rapidly leads to loosening of the fastening screws.

In accordance with another design which is described and shown in French patent application No. 94 10310 filed on 24 Aug. 1994 and published under the No. FR-A-2 723 996, the members for fastening the reaction plate on to the support plate consists of a set of rivets or bolts which are arranged in the vicinity of the outer periphery of the pressure plate.

That design has the disadvantage that it reduces the depth of the friction liners, it makes it necessary to connect the reaction plate to the support plate before the module is closed, and to provide the friction disc with central holes, in order to give access to the heads of the studs which secure the support disc to the crankshaft of the engine of the vehicle.

SUMMARY OF THE INVENTION

An object of the present invention is to propose a new design for a clutch module of the type mentioned above, which provides a remedy for the disadvantages that have just been explained.

To this end, the invention proposes a clutch module, characterised in that each fastening member comprises a head, which is received in a complementary housing formed in the friction surface of the reaction plate, and a shank portion passing through the reaction plate, a threaded portion of which projects axially beyond the reaction plate, in order to enable the module to be secured by screw fastening on the support plate, and in that each of the cover plate, the diaphragm, the pressure plate and the friction liners has at least one hole to enable access to be gained to the head of a fastening member with the aid of a tool when the said holes are aligned axially with the head.

Thanks to the invention, the central portion of the friction disc is not affected by the said holes, so that it is possible to make use of a friction disc of the standard type. It is not possible for the fastening member to come loose. It is possible to automate the operation of fastening the module on the support plate.

It will be noted that, because of the invention, the abutments of the diaphragm on the pressure plate and the cover plate are unchanged. In this connection, it is possible to modify the location of the said abutments so that the diaphragm is fitted below the holes in the cover plate, pressure plate and friction liner. These arrangements leave the diaphragm intact, but necessitate very substantial modifications to the tooling for making the pressure plate and cover plate. This results in a departure from standardisation, and an increase in costs.

Thus, the invention enables an inexpensive clutch module to be obtained, which enables the tooling for forming the abutments offered to the diaphragm by the pressure plate and cover plate to be retained.

Also retained are the geometry of the diaphragm, and the distance between the inner ends of the fingers of the diaphragm and the abutment provided on the cover plate for tilting of the diaphragm.

In accordance with further features of the invention:

the fastening members are spaced apart angularly on a common pitch circle, and each of the cover plate, the diaphragm, the pressure plate and the friction liner has a set of holes spaced apart angularly in the same pattern as the fastening members;

the fastening members are spaced apart angularly at regular intervals;

axial retaining means are provided for each fastening member with respect to the reaction plate;

the retaining means are interposed between the head of the fastening member and the housing which receives it;

the retaining means comprise a retaining ring into which the said threaded shank portion is screwed;

- the retaining ring is of a thermally insulating material;
- the diameter of at least one of the holes formed in the cover plate, the diaphragm, the pressure plate or the friction liner is smaller than the largest diameter of the head of the fastening member;
- the diaphragm comprises at its outer periphery a resilient annular ring in the form of a Belleville ring, and the said holes and the axes of the fastening members are spaced apart angularly on a pitch circle which corresponds substantially to the neutral line of the resilient ring;
- the pressure plate includes a set of axial bosses which are spaced apart angularly, and against which the diaphragm bears, and the holes in the pressure plate are disposed angularly between the bosses;
- the friction disc has at least two friction liners carried by the opposed faces of at least one support disc, and the holes in the friction liners extend through the support disc;
- the support disc is a double disc, with a damping ring, optionally divided into projecting elements, being interposed between the two support discs;
- each friction liner is a continuous annular liner;
- each friction liner is a discontinuous annular liner consisting of a set of tile elements of friction material, and the holes in the friction disc are preferably located in intermediate zones between the adjacent tile elements;
- each fastening means is a fastening screw;
- the threaded shank of the fastening screw is arranged to be screwed into a corresponding threaded hole in the support plates;
- the threaded shank of each fastening member is arranged to pass through a corresponding hole in the support plate, and to be screwed into a fastening nut, which is preferably fixed to the support plate.

In general terms, because of the arrangement of the fastening means, it is possible to increase the size of the friction liners, and to form the holes in accordance with the invention.

Further features and advantages of the invention will appear on a reading of the following detailed description, for an understanding of which reference is made to the attached drawings, in which:

DETAILED DESCRIPTION OF THE PREFERRED EMBODIMENT

Figure 1:
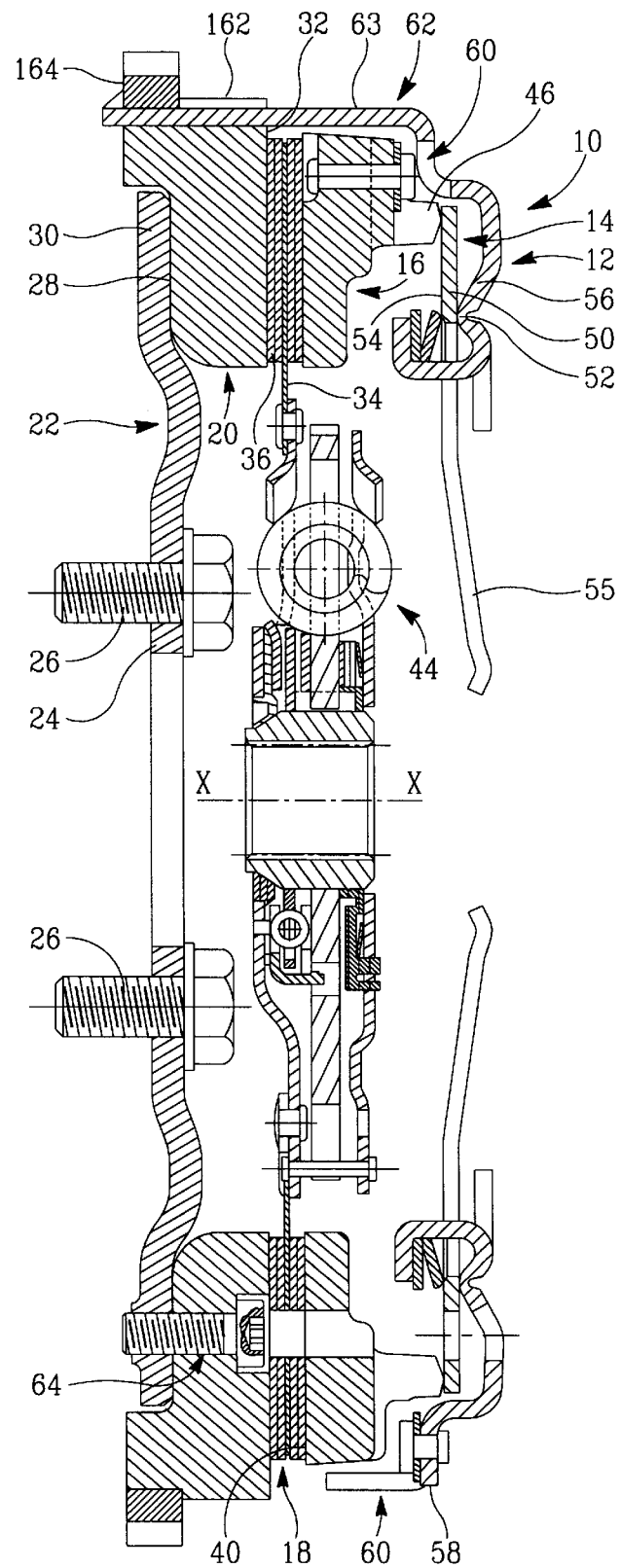
FIG. 1 is a view in axial cross section of one embodiment of a clutch module in accordance with the provisions of the invention.

FIG. 1 shows a clutch module for a motor vehicle.

The module 10, constituting a unitary assembly, comprises an assembly of adjacent components of generally annular form, which are coaxial on the axis X—X of the clutch module. Among these annular components are, in axial succession, a cover plate 12, a diaphragm 14, a pressure plate 16, a friction disc 18 and a reaction plate 20.

The reaction plate 20 is arranged to be carried in rotation on the crankshaft (not shown) of an internal combustion engine for a motor vehicle, being fixed to the latter by means of an interposed support plate 22 in the form of an annular disc, which in this example is of metal, and the central portion 24 of which is fixed to the crankshaft by means of studs 26.

The reaction plate 20 is a cast component of annular form, which is bounded axially by a first radial surface 28, orientated generally transversely, against which the peripheral annular crown portion 30 of the support plate 22 bears, and by an opposite radial surface 32, which is a machined surface that serves as one of the friction surfaces for the friction disc 18.

As in a known version, the friction disc consists here essentially of a generally annular support disc 34 which carries a continuous annular friction liner on each of its opposed faces.

A first liner 36 is arranged to cooperate with the radial friction surface 32 of the reaction plate 20, while the opposite friction liner 38 is arranged to cooperate with a radial friction surface 40 which constitutes one of the two transverse surfaces bounding the pressure plate 16, the latter being a generally annular cast component which is bounded axially, opposite to the friction surface 40, by a generally transversely orientated face 42.

In accordance with a known design, the support plate 34 which supports the friction liners 36 and 38 is arranged to be coupled, through a central hub not identified by a reference numeral, to a driven shaft (not shown), such as for example the input shaft of the gearbox of the motor vehicle, with a damper 44 being interposed.

The module 10 thus includes a friction disc 18 whereby it is coupled in rotation to a driven shaft, together with a plate 22 for fastening it to a driving shaft.

The transverse face 42 of the pressure plate 16 includes a set of bosses 46 which are spaced apart circumferentially at regular intervals, and each of which projects axially towards the cover plate 12, so that they constitute abutments for the external peripheral zone 48 of the resilient annular ring 50 with which the diaphragm 14 is provided at its outer periphery.

In this connection, in accordance with a known design, the diaphragm 14 comprises at its outer periphery a Belleville ring 50 which is interposed elastically between the bosses 46 of the pressure plate 16 and an annular abutment rib 52, which is formed in this example by press-forming so as to extend in relief towards the interior of the cover plate 12, and on which the inner peripheral zone 54 of the Belleville ring bears, the latter being extended inwardly by radial fingers 55, on the inner ends of which a clutch release bearing, not shown, is arranged to act, in this example in a thrust mode.

The function of the Belleville ring 50 is to bias the pressure plate axially in the direction corresponding to axial gripping of the friction disc 18 between the friction surfaces 32 and 40.

The cover plate 12 is of hollow form, and consists essentially of an annular web 56, orientated generally transversely, which includes, in the vicinity of its outer peripheral edge 58, means 60 for its attachment to the pressure plate 16, these attachment means 60 being such as to permit, in accordance with a known design, a relative axial displacement of the pressure plate 16 with respect to the cover plate 12.

These means 60 consist, in this example, of tangentially orientated resilient tongues, which are fixed at one of their ends to the edge 58, and at their other end to the pressure plate 16.

The cover plate 12 also includes at its outer periphery an axially orientated annular skirt 63, which is an extension of the web 56 that constitutes the base of the cover plate 12. The skirt 63 is comb-shaped, and accordingly, it has at its free end a set of fastening lugs 62 which extend axially towards the reaction plate 20, and which enable the cover plate to be fastened on the plate 20 in such a way as to form a clutch module that constitutes a sub-assembly, which is able to be mounted and fixed on the support plate 22 by means of a set of fastening screws 64 made in accordance with the provisions of the invention.

The fastening screws 64, and the through holes whereby access can be gained to them, will now be described in greater detail with reference to FIG. 2.

Each fastening screw 64 consists of a tightening head 66 which is extended axially by a threaded shank body 68.

In accordance with the provisions of the invention, the head 66 is received entirely within a complementary housing formed in the friction surface 32 of the reaction plate 20, this housing comprising in this example a bore 70 which is formed by machining in the surface 32, and which has an internal diameter greater than the largest external diameter of the head 66.

The threaded shank 68 extends through a smooth hole 72, which is formed in the reaction plate 20 and is coaxial with the bore 70 on an axis Y—Y.

Figure 2:
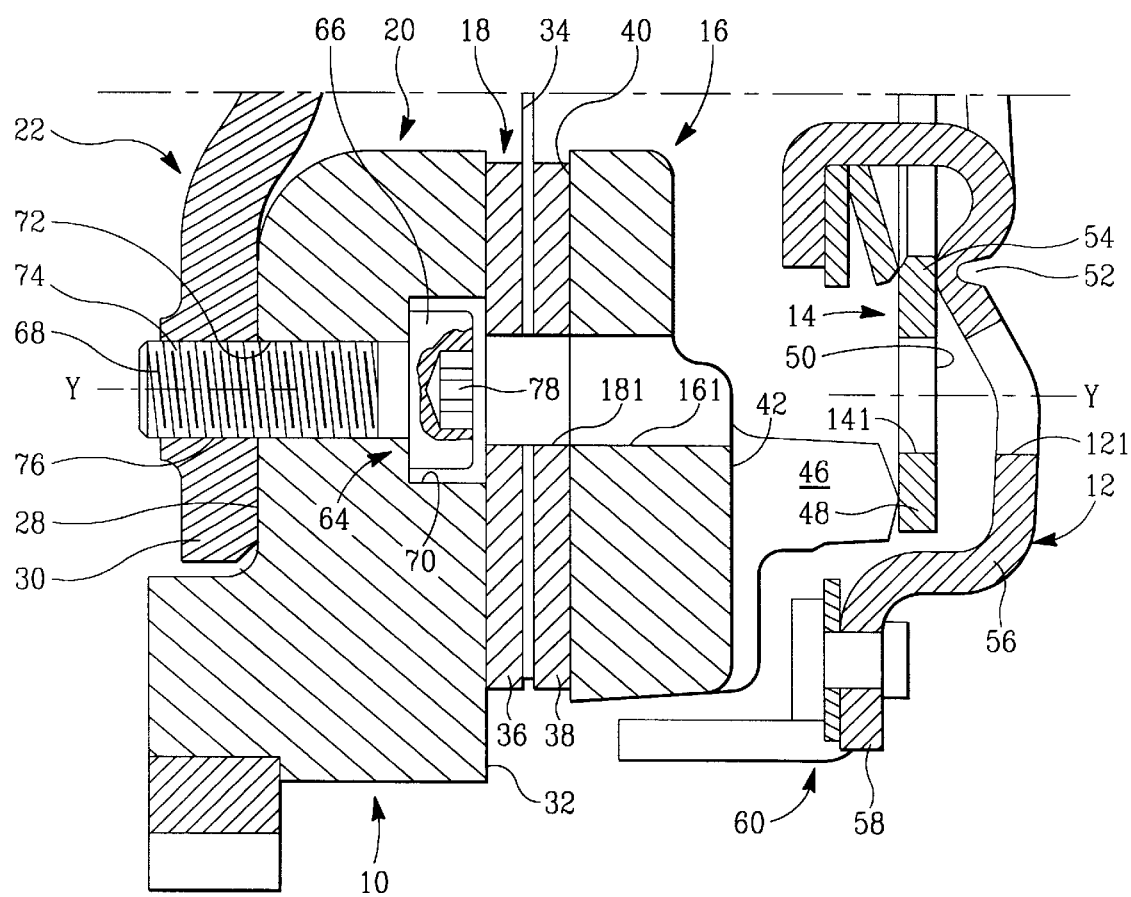
FIG. 2 is a view on a larger scale of the lower part of FIG. 1.

In the embodiment shown in FIGS. 1 and 2, the threaded end portion 74 of each screw 64 is screwed directly into a complementary threaded hole 76 in the peripheral annular crown portion 30 of the support plate 22. For this purpose, the plate 22 has local projecting elements which extend away from the reaction plate 20. The holes 76 are formed in these projecting elements.

In accordance with a known design, the head 66 has means 78 whereby it can be driven in rotation for tightening the screw 64.

In this example, the means 78 consist of a hexagonal blind hole whereby it can be driven in rotation by a screwdriving tool, the end of which has a complementary form.

In another version, it may consist of a simple slot for a screwdriver. Alternatively it may consist of a recess formed in the head, or a configuration of its perimeter, and the head may be of the hexagonal type.

In accordance with the provisions of the invention, and in order to be able to gain access to the head of the screw 66 in order to drive it in rotation with the aid of a screwdriving tool (not shown in the drawings), a set of holes are formed in the other main components of the clutch module 10.

Accordingly, the cover plate 12 has a hole 121 formed in its main portion which consists of an annular plate element 56, the Belleville ring 50 of the diaphragm 14 includes a set of holes 141, the pressure plate 16 has a set of holes 161, and the friction disc 18 has a set of holes 181 which extend through the two annular friction liners 36 and 38 and the annular support disc 34.

For the purposes of mounting and fixing the module 10 by means of the fastening screws 64, a set of fastening screws 64 is provided which are for example spaced apart at regular intervals angularly over the pitch circle having a radius which is equal to the distance separating the axis Y—Y from the central axis X—X of the clutch module 10.

In order to permit simultaneous screwing of all the screws 64, sets of holes 121, 141, 161 and 181 are provided which are spaced apart at regular intervals angularly in the same pattern as the screws 64, and which can be aligned in axial coincidence as shown in FIGS. 1 and 2.

In this aligned position it is possible to introduce a screwdriving tool successively through the holes 121, 141, 161 and 181 in order to gain access to the means 78 for driving the corresponding screw 64.

Fitting of the clutch module on the support plate 22, for securing them together by screw fastening, is made particularly easy due to the fact that the threaded free end portions 74 of the shanks 68 of the screws 64 project axially beyond the transverse surface 28 of the reaction plate 20, and can therefore be easily positioned in facing relationship with the threaded holes 76, or, in another version not shown, be introduced through smooth holes in the support plate 22 in order that they can be screwed into complementary fastening nuts, which are preferably fixed on the plate 22, for example by welding.

In order to prevent the screws, before the clutch module has been fitted and fastened on the support plate 22, leaving their housings 70 and passages 72, and escaping or falling accidentally into the module, it is necessary that they be retained axially in their future fastening position.

For this purpose, and in accordance with a first embodiment shown in the drawings, it is necessary that at least one of the holes 121, 141, 161 or 181 should have a diameter which is smaller than the greatest external diameter of the head 66.

In this example, all the holes have a diameter smaller than that of the heads 60, but it is in all cases preferable that at least the hole 181 should have a diameter smaller than the outer diameter of the head 60, so as to guarantee that the screw will remain in position with respect to the reaction plate 20.

The provision of holes of reduced diameter has the further advantage that it prevents any unduly great reduction in the friction surface areas of the friction liners 36 and 38, and prevents undue weakening of the other components.

In accordance with a further feature of the invention, the holes 141 formed in the portion of the diaphragm 14 that consists of the Belleville ring 50 are preferably arranged and spaced apart substantially angularly along the neutral line of the Belleville ring 50.

Reference may be made to the document FR-A-2 583 483 to discover in detail the design of a Belleville ring of a diaphragm 14, and in particular to understand the position of the neutral line with respect to the outer peripheral zone 48 and inner peripheral zone 54 of the annular ring 50 of the Belleville type.

The holes, or apertures, 141 may be supplementary holes formed in the peripheral annular ring 50, or they may consist of holes and apertures which are necessary in order to obtain correct elastic performance of the diaphragm, in the manner described and shown in the document FR-A-2 583 483.

In accordance with another feature of the invention, the holes 161 formed in the pressure plate 16 are preferably offset angularly with respect to the bosses 46, so as to make it easier to form them, and so not to weaken the pressure plate in the junction zone of the bosses 46 with the face 42.

In the embodiment shown in the drawings, the friction disc 18 consists of a single support disc 34 together with two continuous annular friction liners 36, 38, which are disposed on either side of the disc 34 and fixed to the latter in a known manner, by riveting and/or by adhesive bonding.

The invention is not limited to this embodiment. It is, in particular, possible to make use of a double support disc with a damping ring interposed, this damping ring being optionally divided into radial projecting elements and being of elastomeric material, with the holes 181 extending through the two support discs and the elastomeric ring and the friction liners fixed on the outer faces of the support discs.

In another modified version, it is also possible to make use of a friction disc which includes discontinuous liners consisting of a set of tile elements of friction material adjacent to each other, the holes 181 then being preferably situated in zones which have no friction liners between the adjacent tile elements.

In accordance with a further modified embodiment which is not shown in the drawings, and with a view to retaining the fastening screws 64 in their intended screwing position, it is for example possible to provide a retaining ring into which the threaded free end portion 74 of the shank of each screw 64 is screwed, the retaining ring being preferably made of a heat insulating material, and being interposed between the reaction plate 20 and the peripheral annular crown portion 30 of the support plate 22 while these two components are being fitted and fastened together.

In this last case, the holes 121, 141, 161 and 181 may of course have a very large diameter, for the purpose, for example, of enabling a larger screwdriving tool to be passed through. In another version, a toroidal ring may be interposed between the bore 70 and the head 66 of the screws 64.

The design in accordance with the invention is of particular advantage in that, apart from the facility for relative positioning of the clutch liner with respect to the support plate 22, it enables all of the screws 64, after the holes and screws have been axially aligned with each other, to be tightened simultaneously by means of a screw fastening robot which has as many screwdriving tools, all driven simultaneously, as there are screws 64.

The holes also give improved ventilation for the various components, and especially for the pressure plate 16 and reaction plate 20, and for the friction disc 34.

The screws 64 do not come loose due to differential expansion effects, since their threaded shanks 68 are in engagement with the support plate 22, which is cooler than the reaction plate 20.

The module 10 is particularly compact and easy to make, and modification of the various components, as compared with conventional components, is very much reduced, these components being easy to machine.

The module 10 has fastening means at its outer periphery for fastening the cover plate 12 to the reaction plate 20.

More precisely, in this example each of the lugs 62 of the skirt 63 of the cover plate 12 is engaged in an axial groove 162 formed at the outer periphery of the reaction plate 20.

These grooves 162 constitute mortices, while the lugs 62 act as tenons. The lugs 62 pass below the starter crown 164 which is shrink-fitted on to the outer periphery of the reaction plate.

The grooves 162 are of reduced height in the region of the crown 164, so as to define a shoulder at the outer periphery of the reaction plate 20 for axial location of the crown 164.

The lugs 62 are welded on to the starter crown at their free ends. In another version, the lugs 62 may of course be bent radially back towards the centre into contact with the front face of the reaction plate 20. In a further version, the reaction plate may have beads at its outer periphery, for the local seaming of the skirt 63 to the cover plate, as in FIG. 6 of the document FR-A-2 546 594 (FIG. 6).

In the present example, there are three sets of tongues 60, spaced apart at regular intervals over the circumference, but this does depend on the application. It will be noted that the flange 58 is pierced in order to give access to the rivets by which the tongues are fastened on the pressure plate 16 (FIG. 1). To this end, recesses are formed in the friction surface 40 of the pressure plate 16 in order to give access to the heads of the rivets, with the pressure plate 16 being fixed to the cover plate 12 before the friction disc and screws 64 are fitted in place and the cover plate 12 is finally secured on the reaction plate 20.

It will be appreciated that, because of the configuration of the module 10, the friction liners 36, 38 may come very close to the skirt 63.

For a given radial size, the liners 36, 38 accordingly have the maximum size which enables the holes in accordance with the invention to be formed.

It will also be appreciated that the torsion damper 44 is intact. It is therefore possible to make use of a friction disc 18 with a standard type damper 44. In this example, as in the document FR-A-2 723 996 already mentioned, the damper 44 comprises two torsion damping devices arranged for action in stages, namely a main damper with two guide rings fixed to the support disc 34, and arranged on either side of a damper plate which meshes with the hub with a circumferential clearance, and a predamper which is disposed axially between one of the guide rings and the damper plate of the main damper. In this example the predamper is in the form of a cassette having a radial size smaller than that in the document FR-A-2 723 996.

It will be seen that the friction liners in that document are smaller than that in the present invention.

Here, because of the fastening means (i.e. the lugs 62, the mortices 162 and the welding) arranged at the outer periphery of the module, the friction liners 36, 38 may be of large depth, so that it is possible to form the holes.

It will be noted that the rib 52 constitutes the primary abutment for the deflecting means whereby the diaphragm 14 is pivotally applied to the cover plate 12.

In this example, these means comprise lugs which are formed by bending and stamping so as to project from the web 56, which has a central hole and which constitutes the base of the cover plate 12, the latter being in this example of metal and of hollow form.

These axially orientated lugs extend through the diaphragm 14 via orifices which are present at the root of the fingers 55, that is to say at the inner periphery of the Belleville ring 50. The free ends of these lugs are, beyond the diaphragm 14 (and after having passed through the latter), bent back radially away from the axis of the assembly in order to form a locating bend, for mounting a support ring in contact with the bent-back ends of the lugs, and for mounting a frusto-conical crown ring which provides a secondary abutment for the diaphragm aligned with the primary abutment 52.

The presence of the support ring is of course not essential.

In another version, the assembly means may comprise spacer bars with profiled heads which offer a secondary abutment to the diaphragm 14. In this example the clutch is of the push-to-release type in which the outer periphery of the Belleville ring 50 bears on the bosses 46, while at its inner periphery the said Belleville ring is mounted for tilting deflection between its primary and secondary abutments.

The present invention is of course not limited to the embodiment described. In another version, the clutch may be of the pull-to-release type, with the Belleville ring of the diaphragm then bearing at its outer periphery on, for example, an annular rib of the cover plate 12, and at its inner periphery on bosses of the pressure plate.

In that case, it is necessary to work in traction, by means of a clutch release bearing, on the inner ends of the fingers of the diaphragm, in order to disengage the clutch. The Belleville ring is of course always provided with the holes 141, and the cover plate with the holes 121.

A single friction liner may be provided. In that case, the support 34 is embedded within this liner.

I claim:

1. A clutch module (10) for a motor vehicle, of the type comprising an assembly of adjacent components of generally annular form coaxial with each other, among which are arranged, in succession, a cover plate (12), a diaphragm (14), a pressure plate (16) coupled in rotation to the cover plate by fastening means (60) for enabling the pressure plate (16) to be displaced axially with respect to the cover plate (12), a friction disc (18) for coupling the clutch module in rotation to a driven shaft, and a reaction plate (20) fixed to the cover plate (12) by fastening means arranged at the outer periphery of the module, of the type in which the friction disc (18) includes at least one peripheral annular friction liner (36, 38), which is interposed between radial friction surfaces (40, 32), in facing relationship with each other, of the pressure plate (16) and reaction plate (20), wherein the diaphragm (14) bears against the cover plate (12, 52) and the pressure plate (16, 40) in order to bias the latter axially in the direction corresponding to gripping of the friction liner, and of the type in which the reaction plate (20) is so configured as to be mounted on a support plate (22) which is fixed in rotation to a driving shaft, by means of a set of fastening members (64) which are disposed radially inwardly with respect to the means fastening the reaction plate (20) on the cover plate (12), wherein each fastening member (64) comprises a head (66) which is received in a complementary housing (70) formed in the friction surface (32) of the reaction plate (20), with a threaded shank portion (74) of the fastening member projecting axially beyond the reaction plate (20, 28), in order to enable the module (10) to be secured by screw fastening on the support plate (22), and each of the cover plate (12), the diaphragm (14), the pressure plate (16) and the friction liners (36, 38) has at least one hole (121, 141, 161, 181) to enable access to be gained to the head (66) of a fastening member (64) with the aid of a tool when the said holes are aligned axially (Y—Y) with the head (66).

2. A clutch module according to claim 1, wherein the fastening members (64) are spaced apart angularly on a common pitch circle, and each of the cover plate (12), the diaphragm (14), the pressure plate (16) and the friction liner (18, 36, 38) has a set of holes (121, 141, 161, 181) spaced apart angularly in the same pattern as the fastening members (64).

3. A clutch module according to claim 2, wherein the fastening members (64) are spaced apart angularly at regular intervals.

4. A clutch module according to claim 1, wherein the diameter of at least one of the holes (121, 141, 161, 181) formed in the cover plate (12), the diaphragm (14), one of the pressure plate (16) and the friction liner (18, 36, 38) is smaller than the largest diameter of the head (66) of the fastening member (64).

5. A clutch module according to claim 1, wherein the diaphragm (14) comprises a resilient annular ring (50) which is substantially coincident with the neutral line of the diaphragm, and in the holes (141) and the axes (Y—Y) of the fastening members (64) are spaced apart angularly on a pitch circle which corresponds substantially to the neutral line of the resilient ring (14, 50).

6. A clutch module according to claim 1, wherein the pressure plate (16) includes a set of axial bosses (46) which are spaced apart angularly, and against which the diaphragm (14, 50) bears, and the holes (161) in the pressure plate (16) are disposed angularly between the bosses (46).

7. A clutch module according to claim 1, wherein the friction disc (18) has at least two friction liners (36, 38) carried by the opposed faces of at least one support disc (34), and the holes (181) in the friction liners (36, 38) extend through the support disc.

8. A clutch module according to claim 1, wherein each fastening means (64) is a fastening screw.

9. A clutch module according to claim ,3, characterised in that the threaded shank (68) of the fastening screw (64) is arranged to be screwed into a corresponding threaded hole (76) in the support plates (22).

* * * * *